United States Patent [19]
Goff

[11] Patent Number: 4,763,352
[45] Date of Patent: Aug. 9, 1988

[54] SECURE HOLDER FOR A DESK TOP COIN OPERATED TELEPHONE

[76] Inventor: Walter S. Goff, 11816 Brownell, Plymouth, Mich. 48170

[21] Appl. No.: 125,159

[22] Filed: Nov. 25, 1987

[51] Int. Cl.$^4$ ............................................. H04M 17/00
[52] U.S. Cl. .................................... 379/145; 379/437; 379/155; 379/445
[58] Field of Search ............... 379/436, 437, 445, 454, 379/155, 428, 143, 145, 150

[56] References Cited

U.S. PATENT DOCUMENTS

| | | | |
|---|---|---|---|
| 2,928,909 | 3/1960 | Allen | 379/454 |
| 3,136,858 | 6/1964 | Conviser et al. | 379/145 |
| 3,715,519 | 2/1973 | O'Leary | 379/454 |
| 3,851,503 | 12/1974 | Trimmer et al. | 379/455 |
| 3,941,951 | 3/1976 | Engstrom et al. | 379/436 |
| 4,292,477 | 9/1981 | Adams et al. | 379/436 |
| 4,396,176 | 8/1983 | Hannula | 248/551 |
| 4,638,121 | 1/1987 | Clark, Jr. | 379/145 |
| 4,645,876 | 2/1987 | Albertson | 379/143 |

*Primary Examiner*—Robert Lev
*Attorney, Agent, or Firm*—Krass & Young

[57] ABSTRACT

A lock-down holder for a desk top coin operated telephone includes a base adapted to receive and retain a telephone. The base is adapted to be affixed to a rigid surface and may further include a coin drawer for purposes of increasing the coin storage capacity of a telephone set.

13 Claims, 2 Drawing Sheets

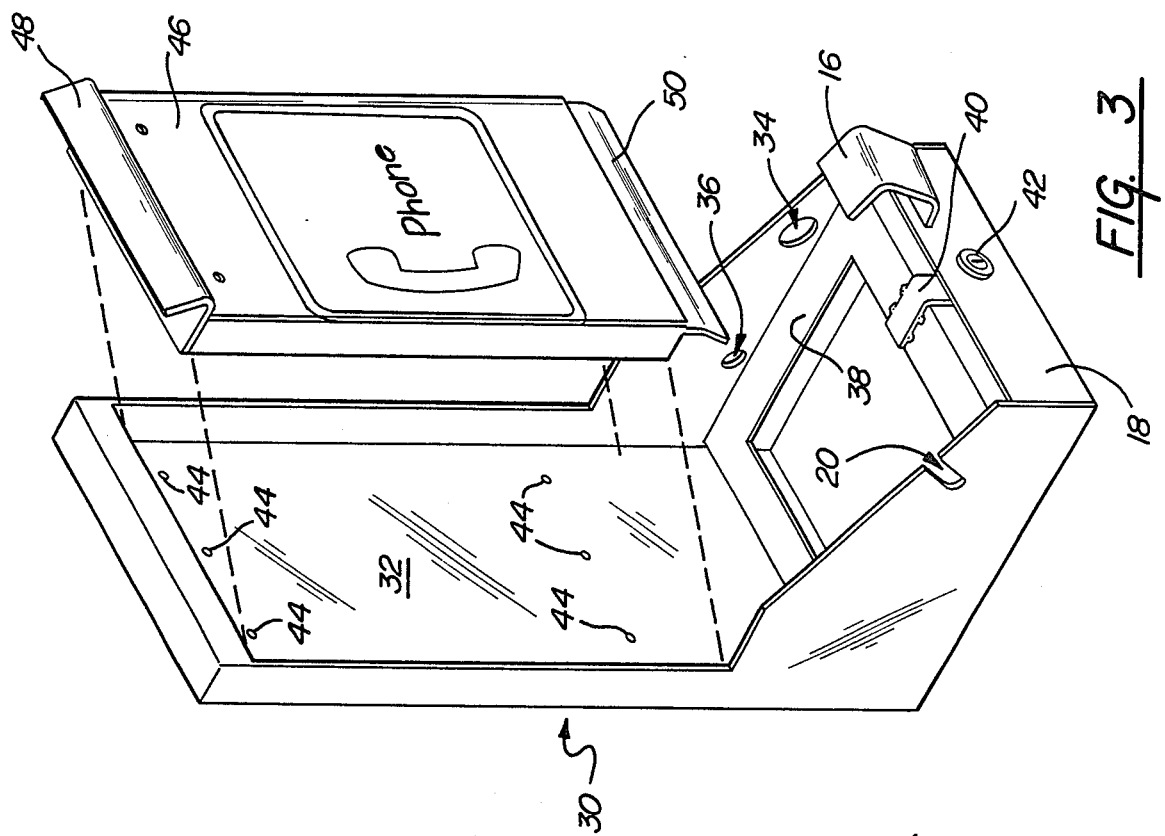
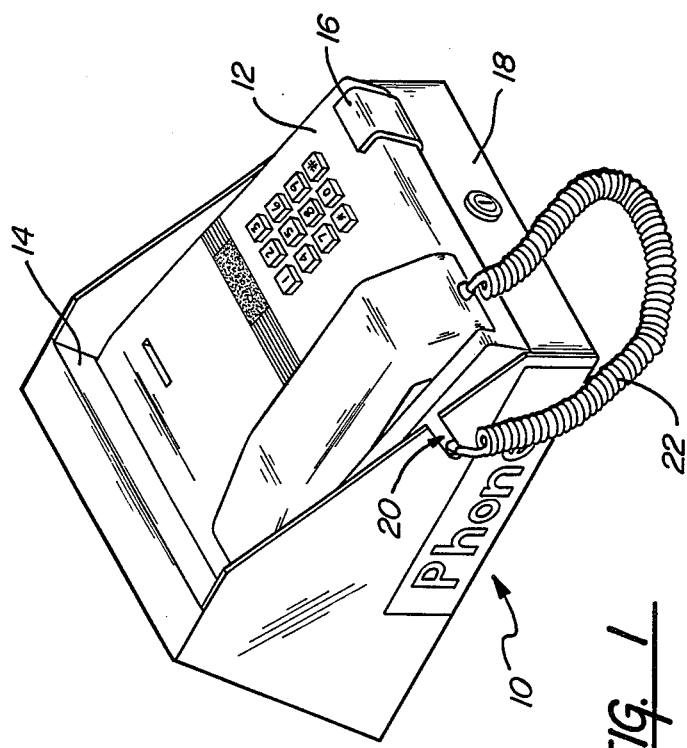
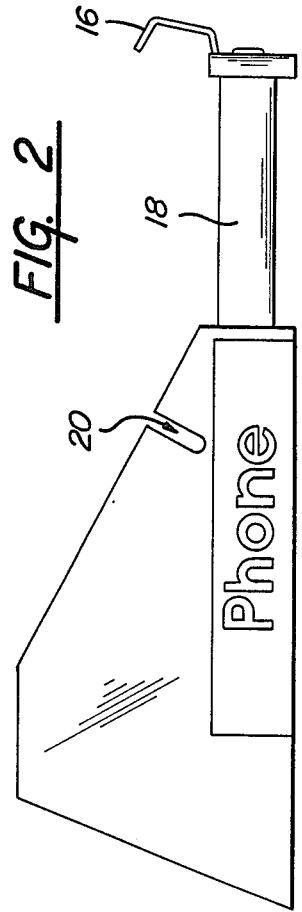

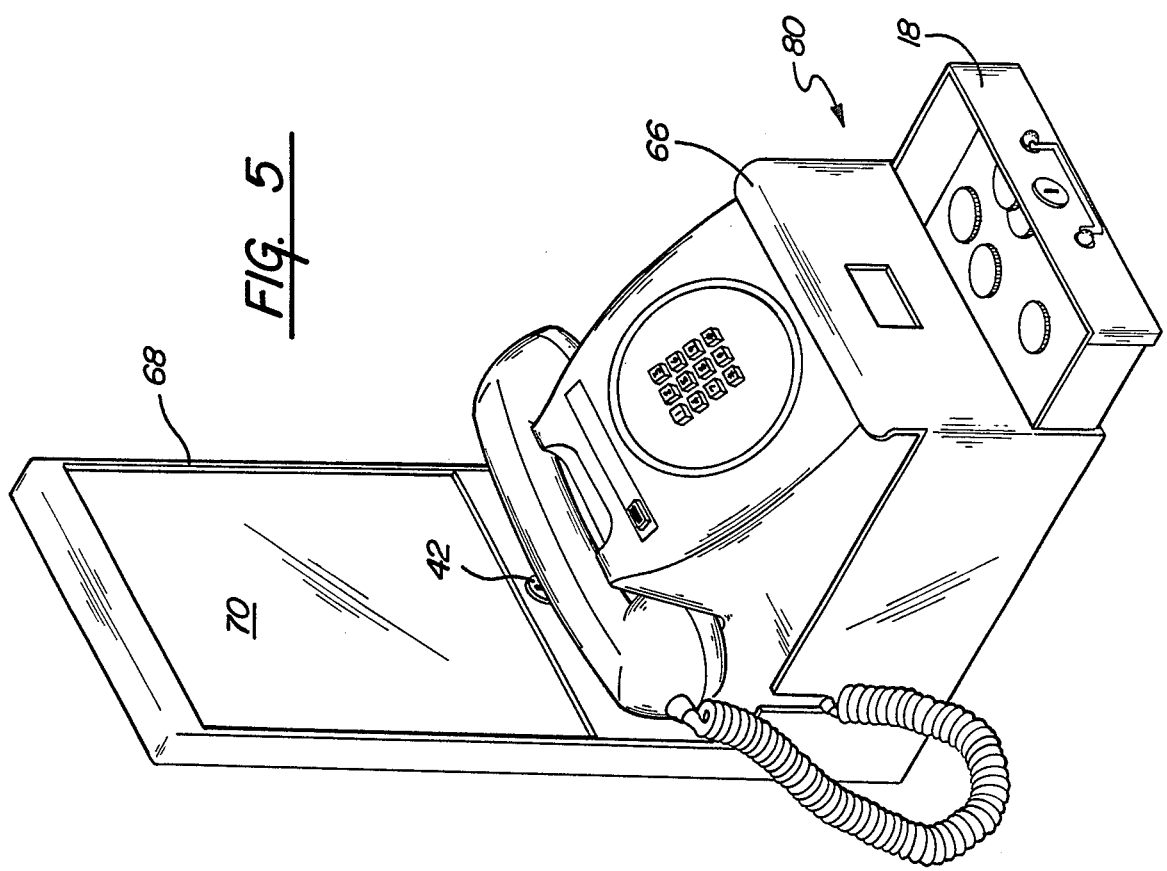
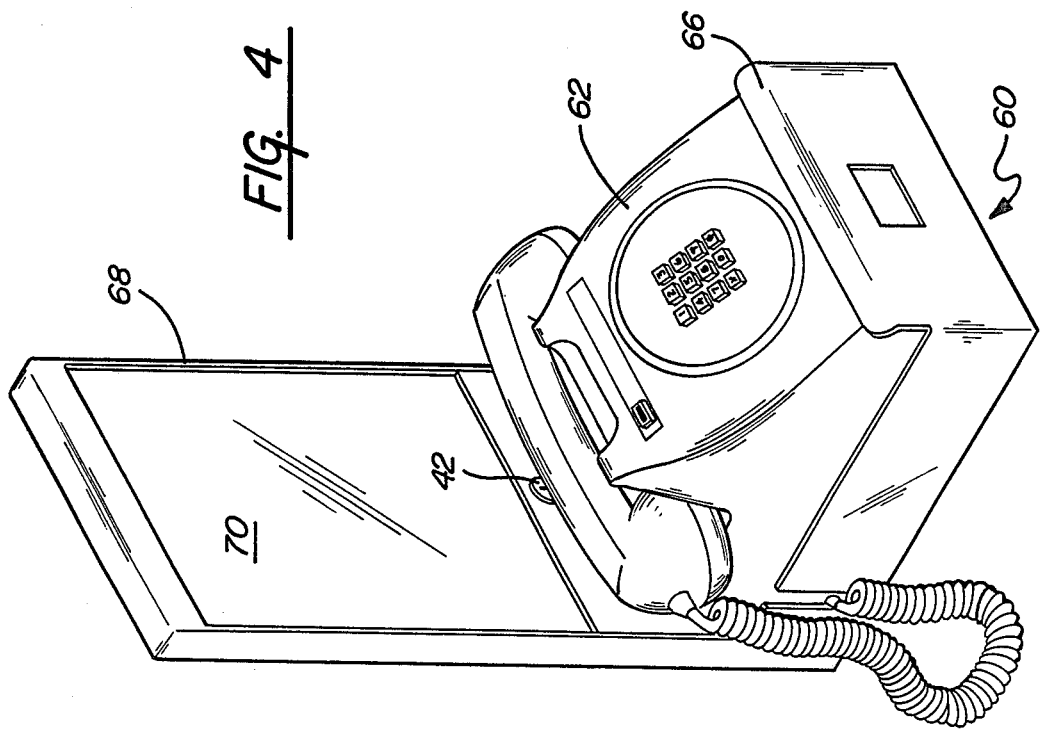

SECURE HOLDER FOR A DESK TOP COIN OPERATED TELEPHONE

FIELD OF THE INVENTION

This invention relates generally to telephones and most particularly to a lock-down holder for a desk top coin operated telephone, adapted to prevent theft of the telephone and/or the contents of its coin box.

BACKGROUND OF THE INVENTION

Pay telephones are standard fixtures in public areas and their ubiquity is a testimony to their growing utility. With the recent advances in telephone design and technology, pay phones which heretofore were large, bulky, electromechanical devices have now been reduced to relatively small sizes.

Desk top pay phones are now becoming standard fixtures in many businesses and offices. Such phones are relatively small items, generally of a similar size to standard consumer telephones. They are frequently owned by owners or operators of businesses and are revenue generating items as well as a service to employees and customers of such businesses. Typically, desk top pay phones fulfill a need for low volume public access calling.

The very portability of such phones is a source of their main problem. A desk top pay phone is secured solely by a single telephone line connection and hence is easily stolen by simply severing that connection and carrying the phone off. In order to conserve space, desk top pay phones generally have a small cash box which tends to be very unsecure. A thief can thus simply walk away with the entire telephone or quickly pry open the coin box and loot the contents.

From the foregoing it should be apparent that there is a need to secure desk top coin operated telephones so as to prevent the theft of the phone and/or its contents. Additionally, it would be desirable to increase the capacity of the coin boxes of such phones.

The prior art presents no solution to the particular problems presented by desk top pay telephones. Heretofore, available utility-owned pay telephones are large, heavy items having a configuration much different than present desk top phones. The prior art is represented by several mounting systems for previously employed pay telephones as for example U.S. Pat. No. 3,398,244 which discloses a mounting assembly for flush mounting a pay telephone so that only the operative portions thereof project outward from a wall. U.S. Pat. No. 4,396,176 discloses a vandal proof telephone booth system having a protective casing adapted to surround a major portion of a prior art pay telephone and further including a bracket adapted to mount such an encased phone so as to prevent vandalism thereof. Neither of these prior art patents disclose mounting assemblies which can be adapted for use with desk top pay telephones.

The present invention provides for a lock-down holder for a desk top coin operated telephone which permits the phone to be readily affixed to a subjacent surface such as a desk top or wall. The holder allows for ready affixation and removal of the telephone without the need for any modification of the telephone assembly itself and in particular embodiments allows for increase in the coin storage capacity of the telephone. These and other advantages of the present invention will be readily apparent from the drawings, description, discussion and claims which follow.

SUMMARY OF THE INVENTION

There is disclosed herein a security lock-down holder for a desk top coin operated telephone. The holder includes a base adapted to receive and retain a telephone and including attachment means adapted to secure the base to a subjacent surface disposed so as to be inaccessible when a telephone is retained therein. The base further includes retaining means adapted to engage and retain a first portion of the base of the telephone and lockable mounting means operative in cooperation with the base to releasably retain a second portion of the telephone. Through the use of a such a holder, the telephone is lockably retained in a fixed relationship with the subjacent surface.

The base may in some instances be adapted to provide a coin box for the telephone, as for example a lockable coin box adapted to be slid out of the base. The attachment means may include a plurality of holes within the holder adapted to receive a mounting screw, bolt or similar member. The holes may be disposed in the base, beneath the body of the telephone and in this manner the holder is adapted to be secured to a horizontal subjacent surface.

In other embodiments, the holder may include a base which is a generally rectangular, horizontally disposed member having a vertically projecting portion with attachment holes disposed in the vertically projecting portion so that the holder is adapted to be secured to a subjacent generally vertical surface. In such instances, the retaining means may comprise a panel adapted to engage the vertically projecting portion of the base cover the attachment holes, and engage and retain a first portion of the body of the telephone. In those instances where the holder includes a coin box, a retaining flange may be included on the coin box to function as mounting means for retaining the second portion of the body of the telephone.

BRIEF DESCRIPTION OF THE DRAWINGS

FIG. 1 is a perspective view of one embodiment of a lock-down holder structured in accord with the principles of the present invention as adapted to retain a flat-design, coin operated telephone;

FIG. 2 is a side elevational view of the holder of FIG. 1 illustrating the coin box thereof;

FIG. 3 is a perspective view of another lock-down holder adapted to mount a flat-design, desk top coin operated telephone onto a vertical surface;

FIG. 4 is a perspective view of yet another embodiment of a holder structured in accord with the present invention and as adapted to mount an upright coin operated telephone; and FIG. 5 is a perspective view of yet another holder generally similar to that of FIG. 4, but including a coin drawer therein.

DETAILED DESCRIPTION OF THE INVENTION

Referring now to FIG. 1, there is shown a first embodiment of the present invention comprising a security lock-down holder 10 for a flat-design desk top coin operated telephone 12. Such flat-design telephones are presently commercially available and one particular model is sold under the name "Changemaster" and is available from the North American Bell Telephone Company of Berkley, Michigan. It will be noted from FIG. 1 that the holder 10 is adapted to retain the telephone set 12 therein and toward that end the holder 10 includes an overhanging portion 14 which cooperates with the remainder of the body of the holder 10 to form a channel adapted to engage and retain a first portion of the body on the telephone 12. Additionally, the holder 10 includes a retaining flange 16 adapted to engage and retain a second portion of the body of the telephone.

The lock-down holder 10 includes a coin drawer 18 disposed in the base thereof and oriented so as to be beneath the body of the telephone 12. The coin drawer 18, as is best seen in FIG. 2 is adapted to slide in and out of the base of the holder 10 to permit emptying thereof. The retaining flange 16 is preferably attached to the coin drawer so as to permit placement and removal of the telephone 12 by the simple expedient of opening the coin drawer 18 and withdrawing the flange 16 from engagement with the telephone.

The coin drawer is not an essential feature of the present invention; however, in many cases its inclusion is most advantageous insofar as the coin storage capacity of most desk top coin operated telephones is relatively limited. Generally, access to the coin box of desk top coin operated telephones is via a removable door in the base thereof. By simply removing this door, coins are allowed to drop into the drawer 18.

Although not visible in the drawings of FIGS. 1 and 2, the bottom of the holder 10 is provided with a number of holes therein adapted to receive retaining screws, bolts or other such fasteners for purposes of affixing the base of the holder to a subjacent surface. When the coin drawer 18 is installed and the telephone 12 affixed, the screws or other attachment means are protected so as to prevent unauthorized removal of the telephone. The security lock-down holder of the present invention is preferably fabricated from a durable material such as welded steel so as to limit vandalism thereof. Alternatively rugged polymeric materials as well as other metals may be similarly employed.

It should also be noted that while the coin drawer 18 is shown as a feature of the embodiment in FIG. 1, obviously the invention may be fabricated without the inclusion of such feature. Those instances where a coin drawer is eliminated, the retaining flange 16 may be provided with a locking mechanism to affix it to the base, or the entire front panel of the base may be fabricated to be removable in a manner analogous to the sliding out of the coin drawer 18. It will also be noted from the figure that the body of the holder 10 includes a slot 20 configured and disposed so as to permit the cord 22 of the telephone 12 to pass therethrough. Obviously the placement of the slot 20 will depend upon the particular configuration of the telephone employed.

Referring now to FIG. 3 there is shown yet another embodiment of security lock-down holder 30 structured in accord with the principles of the present invention. The holder 30 of FIG. 3 is generally similar to that of FIG. 1 except that it further includes a vertical portion 32 attached thereto. The embodiment of FIG. 3 is adapted to retain a flat model desk top coin operated telephone generally similar to the telephone 12 of FIG. 1; however, the holder 30 of FIG. 3 is further adapted for mounting upon a vertical surface such as a wall or post. It will be noted from the figure that the holder 30 includes a coin drawer 18 having a retaining flange 16 affixed thereto as well as a slot 20 disposed to accomodate a telephone cord. Also apparent from the figure are two other openings 34,36 disposed so as to permit other cords from the telephone to pass therethrough.

FIG. 3 also illustrates the interior of the coin drawer 18, depicting a ledge 38 disposed interiorly of the base 30 and adapted to support the telephone as well as a portion of a hasp 40 adapted to engage the coin drawer lock 42. The vertical portion 32 is adapted for mounting upon a vertical surface and toward that end includes a plurality of mounting holes 44 therein adapted to retain mounting screws, bolts and the like. In the FIG. 1 embodiment, a portion 14, of the base of the holder functions to retain a first portion of the body of the telephone; in the FIG. 3 embodiment, this portion is absent and its function is provided by a panel 46 which is retainably received in the vertical portion 32. The panel 46 includes a first flange 48 adapted to engage the vertical portion 32 and a second flange 50 adapted to retain the body of the telephone set.

In use, the holder 30 of FIG. 3 is affixed to a vertical surface by means of the mounting holes 44. The upper flange 48 of the panel 46 is engaged into the vertical portion 32. The coin drawer 18 is opened so as to remove the retaining flange 16 from the vicinity of the base of the holder thus allowing a telephone set to be slid into the base 30. The telephone set is supported upon the ledge 38 and the lower flange 50 of the panel 46 engages the body of the telephone. In this manner the panel 46 is supported and retained in the vertical portion 32 by the telephone, which in turn has a first portion of the body thereof retained by the lower panel flange 50. The coin drawer 18 is then closed and the retaining flange 16 engages a second portion of the body of the telephone. In this manner the telephone is securely retained within the holder 30 which is securely affixed to the vertical surface. Unauthorized removal of the holder and/or telephone is prevented by the lock 42 and panel 46 which protects the mounting screws.

In addition to the flat style desk top coin operated telephones there are presently employed upright model coin operated telephones and accordingly, the present invention may be readily adapted to accommodate such designs of telephones. Referring now to FIG. 4 there is shown a first design of lock-down holder 60 adapted to retain an upright, coin operated, desk top telephone 62. The holder 60 of FIG. 4 is not configured to include a coin drawer therein but in general is similar to those holders previously described.

The holder 60 of FIG. 4 includes a base adapted to support a telephone and having a flange 66 formed by the front portion thereof disposed so as to retain a first portion of the body of the telephone 62. To retain the back portion of the telephone 62, the holder 60 includes a vertical portion 68 including a panel 70 retained therein and generally similar to the panel 46 of FIG. 3. The panel 70 includes a flange similar to that previously shown, (not visible in this view), which engages and retains the rear portion of the base of the telephone 62. The panel 70 of FIG. 4 is equipped with a lock 42 disposed to engage a hasp within the vertical portion 68 of the base 60 so as to permit retention and removal of the telephone set 62.

The holder 60 of FIG. 4 may be further adapted to accommodate a coin drawer. FIG. 5 depicts one such holder 80 including a coin drawer 18 therein. In general, the holder 80 of FIG. 5 is similar to that described with reference in FIG. 4 insofar as it includes a flange 66 for retaining the front portion of the body of the telephone, a panel 70 having a lock 42 adapted to cooperate with a vertical portion 68 of the holder 80 to retain a telephone set 62 therein.

Both the FIG. 4 and FIG. 5 embodiments may be mounted in either a vertical or horizontal orientation and toward that end may include mounting holes appropriately located in the vertical portion 68 or the bottom of the base of the holder 80.

It should be apparent from the foregoing that a relatively lightweight, compact unit may be used to secure a desk top coin operated telephone. The unit can be configured to include a coin drawer for augmenting the coin storage capacity of the desk top coin operated telephone and may be configured to lockably retain the telephone and may further include secure mounting means disposed so as to be protected from tampering when the telephone is mounted therein. In light of the foregoing general principles it should be apparent that many modifications and variations of the present invention are possible in accord with the principles disclosed herein. It should therefore be kept in mind that the foregoing drawings, discussion and description are merely meant to be illustrative of various principles and embodiments of the present invention and not limitations upon the practice thereof. It is the following claims, including all equivalents which define the scope of the invention.

I claim:

1. A security lock-down holder for a desk top coin operated telephone comprising:

a base adapted to receive and retain a desk top coin operated telephone, said base including attachment means adapted to secure the base to a subjacent surface and disposed so as to be inaccessible when a telephone is retained therein, said base further including retaining means adapted to engage and retain a first portion of the base of the telephone; and lockable mounting means operative in cooperation with the base to releasably retain a second portion of the body of the telephone, whereby the telephone is lockably retained in a fixed relationship with the subjacent surface.

2. A holder as in claim 1, wherein said base is further adapted to provide a coin box for the telephone.

3. A holder as in claim 2, wherein said base includes a lockable coin box adapted to be slid out of the base.

4. A holder as in claim 1, wherein said attachment means includes a plurality of holes adapted to receive a mounting screw.

5. A holder as in claim 4 wherein said holes are disposed in the base and beneath the body of the telephone and wherein said base is adapted to be secured to a horizontal subjacent surface.

6. A holder as in claim 4, wherein said base is a generally rectangular, horizontally disposed member having a vertically projecting portion and wherein said attachment holes are disposed in the vertically projecting portion, said holder adapted to be secured to a subjacent, generally vertical surface.

7. A holder as in claim 6, wherein said retaining means comprises a panel adapted to engage the vertically projecting portion of the base and cover the attachment holes therein, said retaining means further including a projecting portion adapted to engage and retain the first portion of the body of the telephone.

8. A holder as in claim 6, wherein said retaining means comprises a flange formed upon the base and wherein said mounting means comprises a panel adapted to engage the vertical portion of the base in a locking relationship and including a projecting portion adapted to engage the second portion of the telephone body.

9. A holder as in claim 3 wherein the mounting means comprises a projecting flange affixed to the coin box.

10. A security lock-down holder for a desk top coin operated telephone comprising a generally rectangular base configured to receive and retain a desk top coin operated telephone, said base including a retaining channel adapted to engage and retain a first portion of the body of the telephone, a coin box disposed so as to be retained beneath the telephone, and said coin box adapted to be slid in and out of the base and including a lock associated therewith to prevent removal of the coin box from the base, said coin box further including a telephone retaining flange projecting therefrom and adapted to engage and retain a second portion of the body of the telephone when the coin box is locked; said base further including a plurality of attachment holes adapted to affix the base to a subjacent surface.

11. A holder as in claim 10, wherein said base further includes a vertically projecting portion having a plurality of attachment holes therein and a panel adapted to (1) be retainably received by the vertically projecting portion and (2) retain the first portion of the body of the telephone.

12. A security lock-down holder for a desk top coin operated telephone comprising a generally rectangular base adapted to receive and retain a desk top coin operated telephone and including a vertically projecting portion thereupon, said base further including a flange adapted to retain a first portion of the body of the telephone and a panel adapted to (1) engage and be retained by the vertically projecting portion and (2) engage and retain a second portion of the body of the telephone, said panel including locking means for engaging the vertically projecting portion, whereby said telephone is lockably retained in the holder.

13. A holder as in claim 12, further including a coin box disposed in said base in subjacent relationship with the telephone, said coin box adapted to be slid out of the base and including locking means for preventing unauthorized removal of the coin box.

* * * * *